United States Patent [19]

Huffman

[11] 4,227,879
[45] Oct. 14, 1980

[54] CONCENTRATED DIRECT DYE SOLUTION

[75] Inventor: Allan M. Huffman, Lock Haven, Pa.

[73] Assignee: American Color & Chemical Corporation, Charlotte, N.C.

[21] Appl. No.: 897,130

[22] Filed: Apr. 17, 1978

[51] Int. Cl.$^2$ .................. C09B 27/00; D06P 1/02
[52] U.S. Cl. ........................... 8/602; 260/191; 8/604; 8/662
[58] Field of Search ........... 8/41 R, 85 R, 88, 85 A, 8/172 R

[56] References Cited

U.S. PATENT DOCUMENTS

| | | | |
|---|---|---|---|
| 3,681,320 | 8/1972 | Franklin | 260/175 |
| 3,700,653 | 10/1972 | Frei et al. | 260/161 |
| 3,829,287 | 8/1974 | Litke | 8/88 |
| 3,852,029 | 12/1974 | Bolliger et al. | 8/41 R |
| 3,995,997 | 12/1976 | Boehmke et al. | 8/84 |
| 4,019,858 | 4/1977 | Conger | 8/85 R |
| 4,077,767 | 3/1978 | Bleck et al. | 8/85 R |
| 4,087,245 | 5/1978 | Kramer et al. | 8/85 A |

FOREIGN PATENT DOCUMENTS 7204084 10/1972 Netherlands.

*Primary Examiner*—A. Lionel Clingman
*Attorney, Agent, or Firm*—Armstrong, Nikaido, Marmelstein & Kubovcik

[57] ABSTRACT

Concentrated solutions of a direct dye having, in the free acid form the formula:

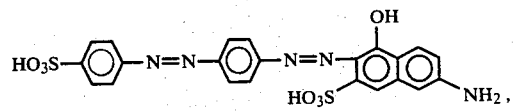

are described. The solutions contain 10–30% (by weight) of the dye, 5–20% of one or more specifically defined bases; 0–5% of alkali metal cations; and 45–85% water and have a lower viscosity and solvent to dye ratio than solutions of the dye of similar strength prepared according to prior art methods. The solutions are prepared by isolating the diazonium salt of p- (p-aminophenyl)azo benzenesulfonic acid then coupling the diazo into J-Acid.

5 Claims, No Drawings

CONCENTRATED DIRECT DYE SOLUTION

BACKGROUND OF THE INVENTION

1. Field of the Invention

The present invention relates to stable, concentrated, low-viscosity solutions of direct dyes. More specifically, the invention relates to high strength liquid dyes wherein the dye is formed by diazotizing 4'-aminoazobenzene-4-sulfonic acid and coupling into J-Acid.

2. Description of the Prior Art

Liquid dyes are commercially important for dyeing papers, textile goods, carpet structures and other materials such as glass fibers. These liquid dyes may be direct, acid, and basic dyes and are ideally completely dissolved in water in high strength. High strength means that the liquid dye is 25%–50% the strength of the corresponding commercial powder version of the dye. Commercial dyes usually range from about 20% to 60% pure dye, the balance being processing salts or dyeing adjuvants. Thus, the amount of pure dye in a high strength liquid dye will be in the range 5% to 30% pure dye.

The prior art discloses various means for achieving the desired solubility and strength of liquid dyes. These include the use of organic solvents, selected cations, metallization aids and the like. Among the organic solvents and aids disclosed for liquid dyes are dimethylsulfoxide (U.S. Pat. No. 3,551,088); glycols and glycol ethers, amides, butyrolactone, acetonitrile, tetrahydrofuran, dioxane, dimethylsulfoxide, and N-methylpyrrolidene (U.S. Pat. No. 3,346,322). Acid amides (preferably urea) are disclosed in British Pat. No. 1,202,798 and U.S. Pat. No. 4,023,924; hydroxyethylated quaternized alkyl amines, isopropyl alcohol, butyl alcohol, ethyl alcohol, formamide and dimethylformamide in U.S. Pat. No. 3,995,997; ε-caprolactam/polyalcohol association compounds in U.S. Pat. No. 3,963,430; monopropanolamine, 1-amino-2-hydroxypropane and aminothiole in U.S. Pat. No. 3,700,653; and tertiary amines in U.S. Pat. No. 3,852,029. Diethanolamine is disclosed as a metallization aid and a solvent in U.S. Pat. No. 3,829,287 and triethanolamine is used as an acid acceptor in U.S. Pat. No. 3,681,320.

Despite the extensive prior art relating to liquid dyes, a need still exists for specific applications for more highly concentrated dyes having an optimum balance of properties such as a low ratio of organic compound (i.e., organic solvent, solubilizing aid, etc.) to dye (because of ecological reasons), low viscosity and increased stability.

It is an object according to the present invention, therefore, to provide concentrated liquid dye solutions wherein the dye, in free acid form, has the formula (I):

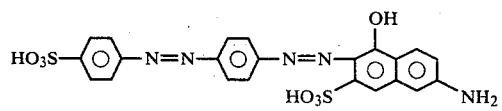

It is a further object to provide the concentrated liquid dyes as defined above and having superior stability while maintaining a low viscosity.

A liquid dye of the above structure is disclosed by Conger, Sr., U.S. Pat. No. 4,019,858. However, the Conger, Sr., liquid contains 15–16% of the organic solvent, urea, at 29–31% strength (Conger, Sr.; Example 1).

SUMMARY OF THE INVENTION

According to the present invention there is provided highly concentrated liquid direct dye solutions having particular utility in the dyeing of glass fibers and a process for manufacturing the dye. The dye in free acid form has the structure shown in formula (I). The new, highly concentrated solution contains 10–30% of the above dye, 5–20% of one or more bases selected from 2,2'-iminodiethanol (diethanolamine), choline, monoethanolamine, dimethylethanolamine, diisopropanolamine, and N-hydroxyethyl-N-methylmorpholinium hydroxide, about 0–5% alkali metal cations, such as sodium, with the balance of the liquid dye being water.

The highly concentrated liquid dye is formed preferably by diazotizing p-[(p-aminophenyl)azo]benzenesulfonic acid, isolating the precipitated diazonium salt, and adding the diazonium salt to 6-amino-1-naphthol-3-sulfonic acid ("J-Acid") in water which has been adjusted to pH=5.0 to 8.5 by one of said bases. The pH is maintained at 5.0 to 8.5 by the addition of the base.

DESCRIPTION OF PREFERRED EMBODIMENTS

The term "liquid dye" as employed herein means ideally a true solution. In actual commercial practice, however, liquid dyes are sometimes stable uniform suspensions or emulsions. The important commercial requirements are that the liquid dye be uniform in strength, pumpable and easily metered, and be stable to storage over periods of time ranging from days to months.

The liquid dye according to the present invention which meets these requirements is prepared by first diazotizing p-[(p-aminophenyl)azo]benzenesulfonic acid (commonly referred to as 4'-aminoazobenzene-4-sulfonic acid). The diazotization is carried out according to the usual (conventional) methods. Following diazotization the precipitated diazonium salt is isolated by filtration and added to a mixture of water and J-Acid (6-amino-1-naphthol-3-sulfonic acid) to effect coupling. Although it is believed that the pH of the J-Acid coupling solution can be maintained at a pH of 5.0 to 8.5, ideal results have been obtained by adjusting the pH of the mixture of J-Acid and water to 8.3 to 8.5 prior to the addition of the diazonium salt thereto. The diazonium salt is added slowly to the mixture while maintaining the pH by the addition of the base used initially to adjust the pH of the mixture. As the base there may be used one or more of the following bases: 2,2'-iminodiethanol (diethanolamine); diisopropanolamine; choline; monoethanolamine; dimethylethanolamine and N-hydroxyethyl-N-methylmorpholinium hydroxide.

There is not believed to be much criticality regarding the temperature at which the coupling reaction is carried out and thus this step may be performed at conventional temperatures, for instance, −10° C. to about 50° C.

The amount of water with which the J-Acid is mixed is determined according to the desired strength of the solution.

Following coupling, the resultant "coupling-complete" solution may be used to dye, for example, glass fibers.

Particularly useful liquid dyes according to the invention are those having an absorptivity at the wavelength of maximum absorbance ($a_{max}$) of at least about 17.4 cm$^2$/mg. For definition of absorbance and absorptivity see Analytical Chemistry; 50, 190, (1978).

The invention may be better understood by referring to the following examples.

EXAMPLE 1

Diazo Preparation:

In a 400 ml beaker is added 125 ml of water and 15 g of 4'-aminoazobenzene-4-sulfonic acid sodium salt. The pH is 8.0. Fifteen g of sodium nitrite is added and the slurry is stirred for about thirty minutes. Into a second 600 ml beaker is placed 17 g of 32% hydrochloric acid and cooled to 10° C. The 4'-aminoazobenzene-4-sulfonic acid and sodium nitrite slurry is added to the hydrochloric acid over about one-half hour maintaining the temperature at 10° C. A positive test is maintained with starch-iodide paper and acid to Congo Red paper. The diazo is stirred for two hours at 10° C., and filtered, and washed with 50 ml of water.

The resulting wet cake weighs about 38.9 g.

Coupler Preparation and Coupling:

Into a 400 ml beaker is placed 25 ml of water, 12 g of 6-amino-1-naphthol-3-sulfonic acid (J-Acid) and sufficient diethanolamine to adjust the pH to about 8.5. About 10 g of diethanolamine is required. The coupler solution is iced to 5° C.

The diazo cake prepared above is added slowly and uniformly to the coupler solution over about thirty minutes. The pH is maintained at 8.5 by addition of 2.5 g of diethanolamine. The coupling solution is stirred for two hours at 5°–10° C. and allowed to stir and warm to room temperature.

The coupling can optionally be run at 25°–40° C. with similar results.

Then the coupling is complete, the solution is filtered through a milk filter. There are no solids present. Yield is 192 g of a solution that is 33.5% strength vs. a commercial powder sample. $a_{max}$ is 12.9 cm$^2$/mg.

(The liquid dye so made, when frozen in a refrigerator, completely recovered to a liquid solution upon standing at room temperature.)

The 33.5% liquid dye solution is concentrated by heating to 70° C. and evaporating off water. Strengths and viscosities were determined at various stages of evaporation.

The results are tabulated below:

| Strength | $a_{max}$ | Brookfield Viscosity (25°) | Solution Stability |
|---|---|---|---|
| 50.6% | 19.5 cm$^2$/mg | 14 cps | O.K. |
| 63% | 24.3 cm$^2$/mg | 23 cps | O.K. |
| 75% | 29.0 cm$^2$/mg | 79 cps | O.K. |
| 85% | 32.8 cm$^2$/mg | 134 cps | O.K. |
| 96.8% | 37.4 cm$^2$/mg | 450 cps | O.K., (but very thick) |

EXAMPLE 2

The preparation of Example 1 was repeated, except that choline is used to maintain the pH at 8.5. A satisfactory liquid with acceptable freeze-thaw characteristics and shade is obtained.

The liquid dye has the following properties:

| Strength | $a_{max}$ | Brookfield Viscosity (25°) | Solution Stability |
|---|---|---|---|
| 37% | 14.3 cm$^2$/mg | 8 cps | no precipitation |
| 50% | 19.3 cm$^2$/mg | 12 cps | no precipitation |
| 60% | 23.2 cm$^2$/mg | 12 cps | no precipitation |

EXAMPLE 3

The preparation of Conger, Sr., U.S. Pat. No. 4,019,858; Example 1 was repeated. The resulting liquid dye is 35% vs. a commercial powder sample. The Brookfield viscosity is 480 cps at 20 rpm and 25° C. $a_{max}$ was 13.5 cm$^2$/mg. A sample of the Conger, Sr., example at 38.7% vs. a commercial sample is a very thick slurry with precipitated dye present.

EXAMPLES 4–7

Using the procedure of Example 1, the following liquids were prepared using the indicated organic bases:

| Example | Alkali | Strength | $a_{max}$ | Brookfield Viscosity (25° C.) cps |
|---|---|---|---|---|
| 4 | Ethanolamine | 50% | 19.3 cm$^2$/mg | 14 |
| 5 | Dimethylethanolamine | 50% | 19.3 cm$^2$/mg | 12 |
| 6 | Diisopropanolamine | 50% | 19.3 cm$^2$/mg | 14 |
| 7 | N-hydroxyethl-N-methylmorpholinium hydroxide | 38% | 14.7 cm$^2$/mg | 11 |
| | | 50% | 19.3 cm$^2$/mg | 16 |
| | | 75% | 29.0 cm$^2$/mg | 85 |

Although the invention has been described in conjunction with the above preferred embodiments, it is not be limited thereto but, instead, is intended to include all embodiments within the spirit and scope of the appended claims.

What is claimed is:

1. A concentrated liquid dye solution comprising, by weight:

(a) from 10 up to 30% of a dye, which in its free acid form has the formula:

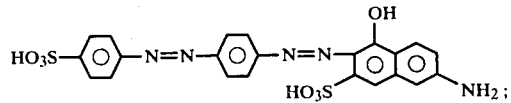

(b) 5–20% of at least one base selected from the group consisting of 2,2'-iminodiethanol, choline, monoethanolamine, dimethylethanolamine, diisopropanolamine and N-hydroxyethyl-N-methylmorpholinium hydroxide;

(c) 0–5% of alkali metal cations; and (d) the balance, to 100%, water, said liquid dye having an $a_{max}$ value of at least 17.4 cm$^2$/mg.

2. The concentrated liquid dye solution of claim 1 wherein said base is 2,2'-iminodiethanol.

3. A process for preparing a concentrated liquid dye solution comprising:

(a) diazotizing (p-aminophenyl)azo benzenesulfonic acid;

(b) separating the resultant diazonium salt from the diazotization mixture;
(c) adding the diazonium salt to a mixture of 6-amino-1-naphthol-3-sulfonic acid in water while maintaining the pH of the mixture from 5–8.5 by the simultaneous addition thereto of a base selected from the group consisting of 2,2'-iminodithanol, choline, monoethanolamine, dimethylethanolamine, diisopropanolamine and N-hydroxyethyl-N-methylmorpholinium hydroxide to form a coupling complete solution.

4. The process of claim 2 wherein the pH of said mixture of 6-amino-1-naphthol-3-sulfonic acid and water is maintained at 8.3–8.5 during the addition of said diazonium salt thereto.

5. The process of claim 4 wherein the pH is maintained by the addition of 2,2'-iminodiethanol.

* * * * *